United States Patent [19]

Stevens

[11] 4,110,182

[45] Aug. 29, 1978

[54] ISOTOPE SEPARATION BY PHOTOSELECTIVE DISSOCIATIVE ELECTRON

[75] Inventor: Charles G. Stevens, Pleasanton, Calif.

[73] Assignee: The United States of America as represented by the United States Department of Energy, Washington, D.C.

[21] Appl. No.: 696,997

[22] Filed: Jun. 17, 1976

[51] Int. Cl.² .............................................. B01J 1/10
[52] U.S. Cl. ..................... 204/157.1 R; 204/DIG. 11
[58] Field of Search ................ 204/157.1 R, DIG. 11

[56] References Cited

U.S. PATENT DOCUMENTS

| 3,740,552 | 6/1973 | Pressman | 204/DIG. 11 |
| 4,000,051 | 12/1976 | Kaldor | 204/DIG. 11 |

OTHER PUBLICATIONS

Henderson et al., Physical Review, 183(1), 1969, p. 157.

Primary Examiner—Howard S. Williams
Attorney, Agent, or Firm—Dean E. Carlson; Roger S. Gaither; Irene S. Croft

[57] ABSTRACT

A method of separating isotopes based on photoselective electron capture dissociation of molecules having an electron capture cross section dependence on the vibrational state of the molecule. A molecular isotope source material is irradiated to selectively excite those molecules containing a desired isotope to a predetermined vibrational state having associated therewith an electron capture energy region substantially non-overlapping with the electron capture energy ranges associated with the lowest vibration states of the molecules. The isotope source is also subjected to electrons having an energy corresponding to the non-overlapping electron capture region whereby the selectively excited molecules preferentially capture electrons and dissociate into negative ions and neutrals. The desired isotope may be in the negative ion product or in the neutral product depending upon the mechanism of dissociation of the particular isotope source used. The dissociation product enriched in the desired isotope is then separated from the reaction system by conventional means. Specifically, $^{235}UF_6$ is separated from a $UF_6$ mixture by selective excitation followed by dissociative electron capture into $^{235}UF_5-$ and F.

13 Claims, 2 Drawing Figures

ISOTOPE SEPARATION BY PHOTOSELECTIVE DISSOCIATIVE ELECTRON

BACKGROUND OF THE INVENTION

The invention described herein was made in the course of, or under, Energy Research and Development Administration Contract No. W-7405-ENG-48 with University of California.

This invention relates to a method of isotope separation, particularly isotope separation by photoselective dissociative electron capture. Specifically, this invention relates to a method of separating $^{235}U$ from $^{238}U$.

Several processes for isotope separation make use of the isotope shift, that is, a slight shift of the lines in the absorption spectra of elements or molecular species due to the small difference in nuclear mass of the isotopes of the same element contained therein. Changes in nuclear mass can shift electronic, vibrational, and rotational energy levels. When the shift places the absorption line of one isotopic species at a frequency at which the others are transparent, it is possible to excite selectively that species with a source of radiation of sufficiently narrow width.

A common feature of all separation methods based on the isotope shift is the selective excitation of one of the isotopic species by radiation, particularly laser radiation, tuned to a specific absorption line, followed by a physical or chemical process which acts on excited species and separates them from unexcited ones. The method for realizing separation following selective excitation of an atom or molecule may or may not require the absorption of a second photon.

Levy et al., U.S. Pat. No. 3,772,519, issued Nov. 13, 1973, for "Method of an Apparatus for the Separation of Isotopes" discloses a process wherein $^{235}U$ in an atomic uranium source is selectively excited to a higher energy level and then ionized by the absorption of a second photon of sufficient energy to ionize the excited species without ionizing the unexcited species. This method requires a very high temperature source; uranium must be heated to temperatures above about 2000° C to provide an atomic vapor of suitable density for isotope separation.

Robieux et al., U.S. Pat. No. 3,443,087, issued May 6, 1969, for "Isotopic Separation Process" is directed to an isotope separation process based on selective photoexcitation of molecular species, e.g., $^{235}UF_6$, followed by selective photoionization of the excited species. A problem with this approach is that the ionization potential is 13.9 eV. Since this is so high in energy, ionization of the excited molecules cannot be accomplished in one stage, that is, with one laser. A multi-step ionization scheme would mean excitation into an absorption band located at about 4000 Å which would result in the dissociation of the $UF_6$ molecules into $UF_5$ and F.

Approaches which attempt to utilize electronic excitation of $UF_6$ with subsequent molecular dissociation run into difficulties in the efficient utilization of photons. The near UV band system is characterized by a long and slowly rising absorption tail. Good enrichment can be obtained by utilizing the origin of this band system with a sacrifice in photon utilization, whereas attempts to couple into the strong absorption region of the band will degrade enrichment severely.

C. Bradley Moore, "The Application of Lasers to Isotope Separation", *Accounts of Chemical Research* 6 323 (1973) discloses a photochemical separation method wherein selective excitation is followed by chemical trapping, that is, by reaction with a scavenger molecule which reacts with the excited state so rapidly that energy transfer cannot occur and reacts with the ground state so slowly that the reagents can be mixed without reaction. One of the problems with such photochemical separation methods is the difficulty of devising a chemical trapping scheme which does not allow isotopic mixing.

Thus, the need exists for an isotope separation scheme which can utilize a low temperature isotope source and which allows for a physical separation of selectively excited species and which provides sufficient enrichment with economic utilization of photons.

SUMMARY OF THE INVENTION

The present invention is directed to an isotope separation method which utilizes a molecular isotope source, that is, molecular species containing a plurality of isotopes of the same element. The molecular species used is characterized by a capability of capturing electrons and, as a result thereof, dissociating into negative ions and neutrals. This phenomenon is referred to as "dissociative electron capture" or "dissociative electron attachment". (See, for example, W. R. Henderson et al., "Dissociative Attachment of Electrons to Hot Oxygen", *Physical Review* 183 (1) 1969, page 157, which describes the observation of this phenomenon in thermally excited oxygen.) The molecular species used in the present process is further characterized by an electron capture cross section dependence on the vibrational state of the molecule.

Broadly, the present isotope separation process comprises selective excitation of molecules containing a desired isotope of an element to a predetermined vibrational state having associated therewith an electron capture energy region which does not substantially overlap the electron capture energy ranges associated with the lowest vibrational states, and exposure to electrons having an energy range corresponding to said non-overlapping electron capture energy region. The selectively excited molecules preferentially capture electrons and fragment into negative ions and neutrals while the unexcited molecules remain substantially undissociated and neutral. Depending upon the mechanism of dissociation of the particular molecular source used, the desired isotope may be contained in either the negative ion product or the neutral product. Separation of the dissociation product enriched in the desired isotope is by conventional means.

It is, therefore, an object of this invention to provide a method for separating isotopes, more particularly, a method for the separation of isotopes based on photoinduced electron capture.

A further object of this invention is to provide an isotope separation method which utilizes a low temperature source.

Still another object of this invention is to provide an isotope separation method which allows for physical separation of selectively excited species.

Other objects and advantages will become apparent from the detailed description made with reference to the accompanying drawing.

DETAILED DESCRIPTION OF THE INVENTION

In accordance with the isotope separation method of the present invention, a gaseous molecular isotope source material is first cooled to a temperature at which all the molecules reside in their lowest vibrational states. The cooled material is then merged with a stream of electrons having an energy range corresponding to the above-described non-overlapping electron capture energy region. The combined electron/molecule stream is subjected to radiation at a preselected frequency to selectively excite those molecules containing the desired isotope to the predetermined vibrational state having associated therewith said non-overlapping electron capture energy region. The selectively excited molecules preferentially capture electrons and fragment into negative ions and neutrals.

The present isotope separation scheme can be represented by either of the following equations depending upon the mechanism of dissociation of the particular molecular isotope source used.

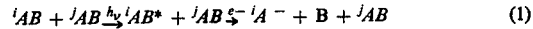  (1)

or

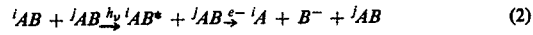  (2)

wherein $^iAB$ represents those molecules containing a desired isotope, $^jAB$ represents those molecules containing an undesired isotope of the same element, and $A$ and $B$ represent atoms or molecular fragments.

For example, if it is desired to separate isotopes of uranium, $UF_6$ can be used as the molecular isotope source. Electron capture dissociation of excited $UF_6$ molecules produces $UF_5-$ as the negative ion and F as the neutral. Thus, the isotopically enriched product is the negative ion product, as represented in equation (1). In this case, the isotopically enriched product, being charged, can readily be separated by electrical extraction, that is, by the application of an electrostatic or electromagnetic field. In some cases, the charge exchange rate may be sufficiently high so that the ion product is converted to a neutral product in accordance with the following mechanism: $^iA^- + {}^jAB \rightarrow {}^iA + {}^jAB^-$. In such cases, the isotopically enriched product, being chemically different from the isotope source material, can be separated therefrom by standard chemical procedures.

As an example of the dissociation mechanism represented by equation (2), consider the separation of nitrogen isotopes using $N_2O$ as the molecular isotope source. Electron capture dissociation of excited $N_2O$ molecules produces the neutral product $N_2$ and the negative ion $O^-$. In this case, the isotopically enriched dissociation product is a neutral product chemically different from the isotope source material and, consequently, separable therefrom by conventional chemical means.

Specifically, the present invention is directed to the separation of $^{235}U$ from $^{238}U$ utilizing a $UF_6$ source, as represented by the following equation:

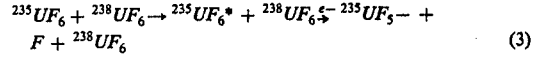  (3)

Figure 1:
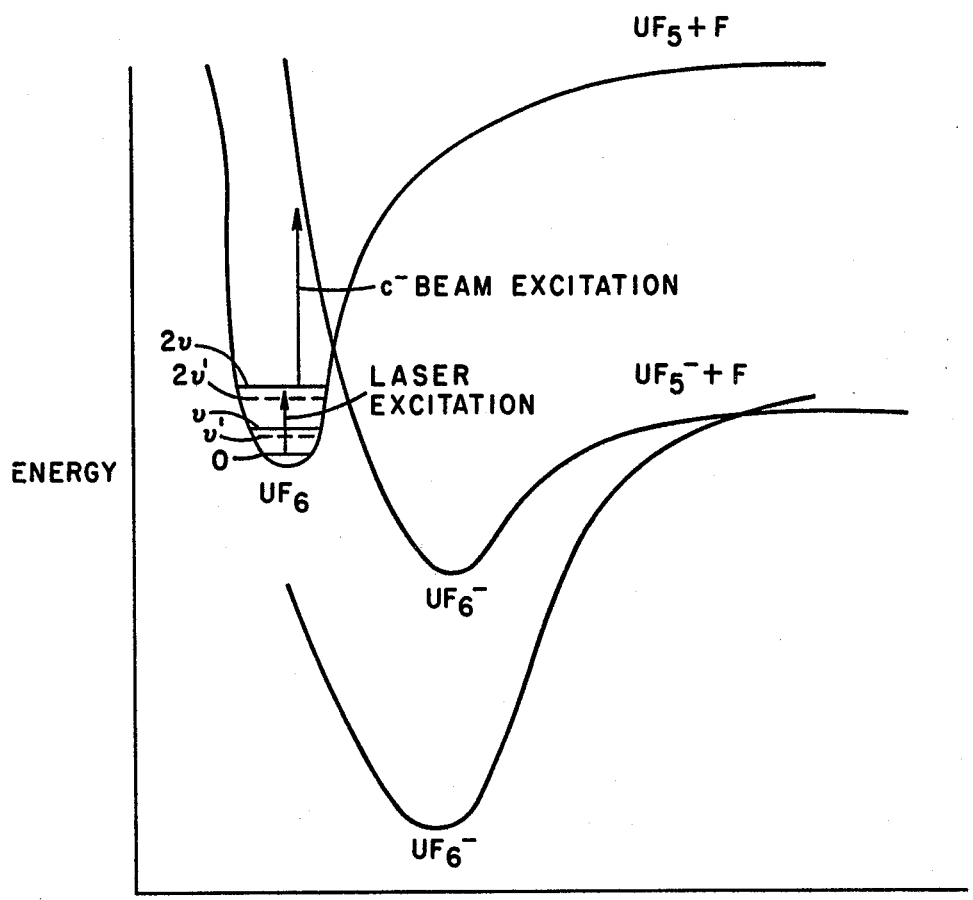
FIG. 1 is a schematic representation of the potential energy curves for a neutral $UF_6$ molecule and a molecular $UF_6$-ion.

Referring to FIG. 1, the solid horizontal lines $\nu$ and $2\nu$ represent exemplary vibrational energy levels of a neutral $^{235}UF_6$ molecule, and the dashed horizontal lines $\nu'$ and $2\nu'$ represent the corresponding vibrational energy levels of a neutral $^{238}UF_6$ molecule. The solid line $\nu_o$ represents the vibrational ground state level.

Substantially all $^{235}UF_6$ and $^{238}UF_6$ molecules of a $UF_6$ source will be in the lowest vibrational states if the mixture is cooled to a sufficiently low temperature. As is known in the art, subjecting such a cooled mixture to radiation, e.g., a laser beam, with the appropriate energy will selectively excite $^{235}UF_6$ to a higher energy state by a vibrational transition leaving the $^{238}UF_6$ molecules substantially unexcited. It is also known that subjecting neutral $UF_6$ molecules to electrons having a broad range of energies with a maximum near 2 eV will produce molecular $UF_5-$ and neutrals (F) by the dissociative electron capture phenomenon referred to hereinbefore.

The broad energy range of the electrons which are captured is interpreted as a series of overlapping energy ranges, each of which is functionally related to a particular vibrational energy state of a $UF_6$ molecule. Since the higher vibrational energy states are characterized by lower capture thresholds and lower capture maxima than the lowest vibrational state, each higher vibrational state has associated therewith a relatively narrow electron capture energy region which is substantially non-overlapping with the electron capture energy ranges associated with the lowest vibrational states. In other words, each higher vibrational energy state of a $UF_6$ molecule has a finite cross section for capturing electrons within a relatively narrow energy range below ground state threshold. It is this feature of the dissociative electron capture phenomenon, illustrated in Table I, which provides the capability to separate $^{235}UF_6$ from $^{238}UF_6$.

TABLE I

| Effect of Vibrational Energy on Electron Capture Energy | | | |
|---|---|---|---|
| Vibrational State | Vibrational Energy | Capture Threshold | Capture Maximum |
| 0 | 0 eV | 1.4 eV | 2.1 eV |
| $\nu_3$ | 0.078 | 1.25 | 1.55 |
| $\nu_1 + \nu_4$ | 0.105 | 1.21 | 1.53 |
| $2\nu_3$ | 0.156 | 1.0 | 1.35 |
| $2(\nu_1 + \nu_4)$ | 0.210 | 0.85 | 1.16 |

Referring to the table, it is to be noted that each excited vibrational state has associated therewith an electron capture energy region below ground state threshold. For the higher vibrational states, such as $2\nu_3$ and $2(\nu_1 + \nu_4)$, this energy region is significantly broad with capture maxima below ground state threshold. Thus, effective selective electron capture by $^{235}UF_6$ molecules with subsequent dissociation can be accomplished by selective excitation of the $^{235}UF_6$ to either the $2\nu_3$ level or the $2(\nu_1 + \nu_4)$ level.

Figure 2:
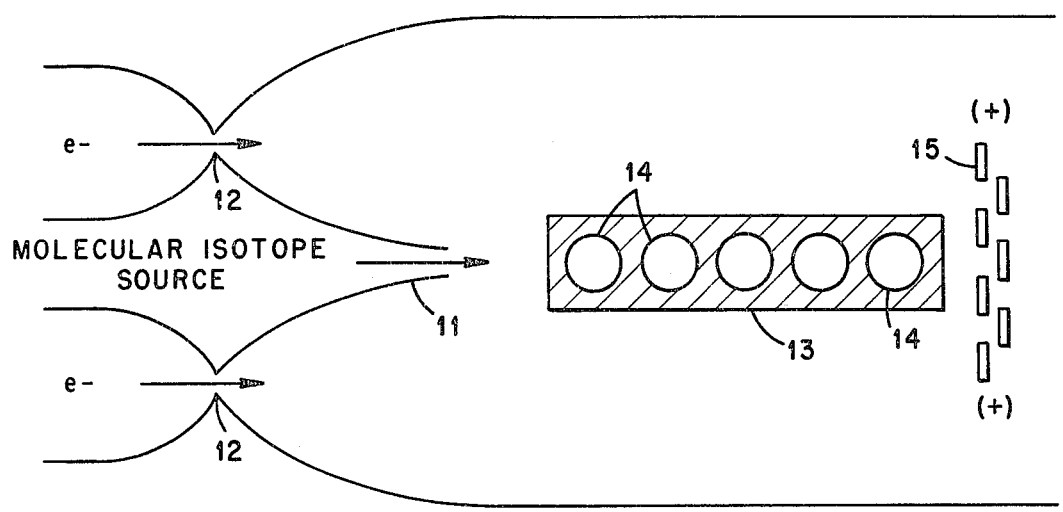
FIG. 2 is a schematic cross-sectional representation of a system suitable for carrying out the process of the present invention.

The present isotope separation process will be described in greater detail with reference to FIG. 2 which is a schematic cross-sectional representation of a suitable system embodiment for carrying out the process. A gaseous stream of a molecular isotope source material is expanded through a nozzle device 11 to cool the mixture to a temperature at which substantially all the molecules reside in their lowest vibrational state. A partially ionized gas (e.g., a rare gas such as argon, krypton, and the like) generated by an RF discharge or arc-jet discharge is used to provide electrons in the appropriate energy range as described above. The partially ionized gas is expanded through nozzle devices 12 to suitably cool the discharge gas kinetic temperature.

The cooled electron source merges with the molecular isotope source in irradiation region 13 which consists of a bank of infrared lasers 14. Lasers 14 are tuned to emit at a preselected frequency to selectively excite the molecules containing the desired isotope to the predetermined vibrational state having associated therewith an electron capture energy region corresponding to the energy range of the supplied electrons. The selectively excited molecules preferentially capture electrons and thereby dissociate into a negatively charged product enriched in the desired isotope and neutral particles. The non-excited molecules remain substantially non-dissociated and neutral. The negative ions enriched in the desired isotope are collected on collection means 15, e.g., a positively charged baffle system held at a temperature above the condensation point of the non-dissociated molecules. The neutral particles, which include neutrals formed in the dissociative electron attachment step and the non-dissociated molecules, remain in the molecular stream as it exits the separation system.

In alternate modes of operation, cooling of the molecular isotope source can be accomplished by a cold flowing stream. Separation of ions can also be accomplished by electric field deflection. Another possibility for the separation step utilizes the strong nucleation property of ions. In a flowing system (stream or nozzle) containing an excess of carrier gas, the formation of negative ions would initiate droplet formation by condensation of the carrier gas on the ion. This droplet formation would effectively insulate the ion from exchange reactions and would also more readily condense on surfaces.

The most suitable radiation source for the practice of the invention is the laser by virtue of the high intensities and high monochromaticity available. The narrow bandwidth and exact wavelength requirements for isotopic selectivity are generally best met by the finely tunable lasers known to those skilled in the art. Generally, the absorption bands for the isotopically selective vibrational excitation of molecular species are found in the infrared region of the spectrum. The presently available $^{14}CO_2$ laser is an efficient infrared source and is suitable for use in the present separation process wherein $UF_6$ is the isotope source.

The following example is illustrative of the process of the present invention.

EXAMPLE

A gaseous $UF_6$ isotope source containing $^{235}UF_6$ molecules and $^{238}UF_6$ molecules is expanded through a suitable supersonic nozzle device under conditions to cool the gas to a temperature in the range of from about 50 to about 100 K and to provide a $^{235}UF_6$ vapor density of about $10^{12}$ molecules/cc in the irradiation region. Substantially all the molecules in the cooled gas are in the lowest vibrational states.

Partially ionized argon generated by RF discharge is used to provide electrons in the energy range of about 0.85–1.16 eV. Concurrently with the $UF_6$ expansion, the partially ionized argon is expanded through suitable nozzle devices under conditions to provide an electron density of about $10^{12}$ electrons/cc in the irradiation region. The nozzle devices are positioned with respect to the $UF_6$ expansion nozzle so that the electron stream merges with the $UF_6$ stream after suitable cooling of the discharge gas kinetic temperature.

The merged electron/$UF_6$ stream is passed through an irradiation region of approximately 30 cm in length. Irradiation is provided by a bank of $CO_2$ laser systems, each system consisting of two $CO_2$ lasers each emitting in the 853 cm$^-$ spectral region to selectively excite the $^{235}UF_6$ molecules to the $2(\nu_1 + \nu_4)$ vibrational state by the successive absorption of two photons. The non-excited molecules comprising $^{238}UF_6$ remain at ground state (0 eV). The excited molecules capture electrons and dissociate into $^{235}UF_5^-$ ions and neutral F atoms. The non-excited molecules do not capture electrons and dissociate since the energy range of the applied electrons is below ground state threshold. The laser power required is in the range of 10–50 watts.

Following the laser induced, selective dissociative electron capture, the reaction system comprises $^{235}UF_5^-$ ions, neutral $^{238}UF_6$ molecules and neutral F atoms. The negative ions are separated from neutrals by collection on a positively charged baffle system extending into the molecular stream and maintained at a temperature above the condensation point of $UF_6$.

A single stage pass provides a theoretical tails assay of 0.2%.

The present process is suitable for the separation of isotopes of any element contained in a molecular species which exhibits an electron capture cross section dependence on the vibrational state of the molecule. The necessary quantitative data for the effect of vibrational energy on electron capture energy for a given molecular species is readily obtainable by experiment. An experimental study of the vibration spectra for the given molecular species will provide isotopic shift data necessary for selective excitation, if such information is not readily available in standard references. By correlating the spectroscopic data with the electron capture energy range data, it is possible to predetermine the most suitable vibrational energy level for optimum separation.

While a specific example and operational sequence for carrying out the invention have been described, modifications and changes will become apparent to those skilled in the art, and it is intended to cover in the appended claims all such modifications and changes as come within the scope of the invention.

What I claim is:

1. A method for separating isotopes by photoselective dissociative electron attachment to molecular species in which an element is present in a plurality of isotopes, those molecules containing a first such isotope being capable of absorbing radiation at a given frequency corresponding to a predetermined vibrationally excited state having associated therewith an electron capture energy region substantially non-overlapping with the electron capture energy ranges associated with the lowest vibrational states of the molecular species to a substantially greater degree than those molecules containing a second such isotope, said molecular species being in the gaseous phase, which method comprises:

cooling the molecular species to a temperature at which substantially all the molecules contained therein reside in the lowest vibrational states thereof;

subjecting the molecular species to radiation at the given frequency, thereby exciting those molecules containing said first isotope to said predetermined vibrationally excited state without substantially vibrationally exciting those molecules containing a second such isotope;

dissociating the vibrationally excited molecules by electron capture dissociation into a neutral product and a negatively charged product without substantially dissociating the unexcited by contacting the molecular stream with electrons having an energy range corresponding to said electron capture energy region associated with said predetermined vibrationally excited state, one of the dissociation products being enriched in said first isotope; and separating the dissociation product enriched in said first isotope from the reaction system.

2. A method according to claim 1 wherein the frequency of the applied radiation is in the infrared spectral region.

3. A method according to claim 2 wherein the infrared radiation source is an infrared laser.

4. A method according to claim 1 wherein the product enriched in said first isotope is a negatively charged product.

5. A method according to claim 4 wherein the negatively charged product is separated from the reaction system by electrical extraction.

6. A method according to claim 1 wherein the product enriched in said first isotope is a neutral product.

7. A method according to claim 1 wherein the molecular species is a molecular species containing uranium in a plurality of isotopes.

8. A method according to claim 7 wherein the molecular species is $UF_6$.

9. A method according to claim 7 wherein the molecular species comprises molecules containing $^{235}U$ and molecules containing $^{238}U$.

10. A method according to claim 9 wherein the molecular species is $UF_6$ containing uranium in a plurality of isotopes, the first such isotope is $^{235}U$, and the dissociation product enriched in the first isotope is $^{235}UF_5-$.

11. A method according to claim 10 wherein the radiation source is a laser.

12. A method according to claim 10 wherein the $^{235}UF_5-$ is separated from the reaction system by electrical extraction.

13. A method for separating isotopes by photoselective dissociative electron attachment to molecular species in which an element is present in a plurality of isotopes, those molecules containing a first such isotope being capable of absorbing radiation at a given frequency corresponding to a predetermined vibrationally excited state having associated therewith an electron capture energy region substantially non-overlapping with the electron capture energy ranges associated with the lowest vibrational states of the molecular species to a substantially greater degree than those molecules containing a second such isotope, said molecular species being in the gaseous phase, which method comprises:

cooling the molecular species to a temperature at which substantially all the molecules contained therein reside in the lowest vibrational states thereof;

combining the cooled molecular species with electrons having an energy range corresponding to said electron capture energy region associated with said predetermined vibrationally excited state;

subjecting the resulting mixture of cooled molecular species and electrons to radiation at the given frequency, thereby exciting those molecules containing said first isotope to said predetermined vibrationally excited state without substantially vibrationally exciting those molecules containing a second such isotope and causing molecular dissociation of the vibrationally excited molecules by electron capture dissociation into a neutral product and a negatively charged product without substantially dissociating the unexcited molecules, one of the dissociation products being enriched in said first isotope; and separating the dissociation product enriched in said first isotope from the reaction system.

* * * * *